US011625774B2

(12) United States Patent
Billman et al.

(10) Patent No.: US 11,625,774 B2
(45) Date of Patent: Apr. 11, 2023

(54) USING POSITION LOCATION INFORMATION TO PRE-POPULATE AND VERIFY INFORMATION ON A CREDIT APPLICATION

(71) Applicant: BREAD FINANCIAL PAYMENTS, INC, Columbus, OH (US)

(72) Inventors: Christian Billman, Gahanna, OH (US); James Magnuson, Jr., Columbus, OH (US)

(73) Assignee: BREAD FINANCIAL PAYMENTS, INC, Columbus, OH (US)

( * ) Notice: Subject to any disclaimer, the term of this patent is extended or adjusted under 35 U.S.C. 154(b) by 137 days.

(21) Appl. No.: 15/879,225

(22) Filed: Jan. 24, 2018

(65) Prior Publication Data

US 2019/0043126 A1    Feb. 7, 2019

Related U.S. Application Data

(60) Provisional application No. 62/542,058, filed on Aug. 7, 2017.

(51) Int. Cl.
*G06F 40/174*    (2020.01)
*G06Q 40/02*    (2023.01)
*G06Q 50/26*    (2012.01)

(52) U.S. Cl.
CPC ......... *G06Q 40/025* (2013.01); *G06F 40/174* (2020.01); *G06Q 50/265* (2013.01)

(58) Field of Classification Search
CPC ... G06Q 40/025; G06Q 50/265; G06F 17/243

USPC ........................................................... 705/38
See application file for complete search history.

(56) References Cited

U.S. PATENT DOCUMENTS

| 2006/0149674 | A1* | 7/2006 | Cook ................. G06Q 40/02 705/44 |
| 2010/0274691 | A1* | 10/2010 | Hammad ......... G06Q 20/3221 705/30 |
| 2014/0316841 | A1* | 10/2014 | Kilby ................ G06K 9/628 705/7.26 |
| 2015/0248665 | A1* | 9/2015 | Walz ............... G06Q 40/025 705/40 |
| 2016/0232148 | A1* | 8/2016 | Stepanenko ......... H04W 4/029 |
| 2016/0267485 | A1* | 9/2016 | Walz ................ G06Q 30/0229 |
| 2017/0286768 | A1* | 10/2017 | Livesay ............... H04W 12/02 |
| 2018/0060954 | A1* | 3/2018 | Yin .................... G06Q 40/025 |

* cited by examiner

*Primary Examiner* — Jessica Lemieux
*Assistant Examiner* — Merritt J Hasbrouck (57) ABSTRACT

Using position location information to pre-populate and verify information on a credit application is disclosed. A mobile application for a retailer is downloaded to a mobile device. The mobile application on the mobile device obtains authorization to access location information on the mobile device. Location information for the mobile device is received at a computer system and from the mobile device, the location information generated by a positioning system on the mobile device, the location information comprising: historic location information stored in a memory of the mobile device and real-time location information. The location information is used to prefill at least a portion of a credit application.

14 Claims, 6 Drawing Sheets

COMPARES, AT THE COMPUTER SYSTEM, THE LOCATION INFORMATION FROM THE POSITIONING SYSTEM WITH OTHER LOCATION INFORMATION PROVIDED ON THE CREDIT APPLICATION
310

MAKES, AT THE COMPUTER SYSTEM, A RISK ASSESSMENT BASED ON A RESULT OF THE COMPARING
320

USING POSITION LOCATION INFORMATION TO PRE-POPULATE AND VERIFY INFORMATION ON A CREDIT APPLICATION

CROSS-REFERENCE TO RELATED APPLICATIONS (PROVISIONAL)

This application claims priority to and benefit of U.S. Provisional Patent Application No. 62/542,058 filed on Aug. 7, 2017, entitled "USING POSITION LOCATION INFORMATION TO PRE-POPULATE AND VERIFY INFORMATION ON A CREDIT APPLICATION" by Christian Billman, and assigned to the assignee of the present application, the disclosure of which is hereby incorporated herein by reference in its entirety.

BACKGROUND

Company specific, brand specific or even store specific credit accounts provide significant value to both consumer and provider. By issuing a store specific credit account, the provider is able to tailor rewards offers, provide loyalty discounts and maintain consumer brand loyalty. Similarly, the consumer receives the perks from the reward offers and the loyalty discounts. In addition, a user receiving rewards and discounts is more likely to recommend the credit account to friends via word of mouth, social networks, internet rating sites, and the like.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DESCRIPTION OF EMBODIMENTS

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "changing", "correlating", "prescreening", "developing", "presenting", "deploying" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

For purposes of the discussion, a user's mobile device may be a mobile phone, a smart phone, a tablet, a smart watch, a piece of smart jewelry, smart glasses, and other user portable devices having wireless connectivity. That is, the mobile device would be capable of broadcasting and receiving via at least one network, such as, but not limited to, WiFi, Cellular, Bluetooth, NFC, and the like. In one embodiment, the mobile device may have a positioning determining system such as global positioning system (GPS) or the like. In another embodiment, the mobile device may be able to determine a location within a given radius, such as the broadcast range of a beacon, WiFi hotspot, overlapped area covered by a plurality of mobile telephone signal providers, or some combination thereof.

For purposes of the present discussion, the mobile device location service, can be, but is not limited to, GPS, WiFi, cellular service, beacon derived location determination and the like. Moreover, the location determined by the mobile device location service may be useful even at differing levels of accuracy. For example, a GPS enabled mobile device can provide location information that is accurate to within a few meters while a cellular service, beacon or WiFi location capabilities of mobile device can provide a location radius or location area. For example, the mobile device being located within range of a beacon, within the overlapping area of a number of cellular service towers, etc.

As described herein, an offer provides an opportunity for the user to receive an incentive, obtain a credit account, or the like. In general, an offer may be delivered via a text message, e-mail, push message, presented via an app on a mobile device, or the like.

For purposes of the discussion, a retail store refers to any physical brick and mortar store that provides goods for sale at the store location. In contrast, a virtual store refers to a website, webpage, or the like that is usually accessed via a web browser and provides goods for sale that are shipped.

The goods may be shipped to a retail store associated with the virtual store, to the buyer's selected address, or the like.

In the following discussion, the term credit application is utilized. In general, a credit application obtains some sort of identification information about an applicant and uses the identification information to make a credit determination. For example, if a consumer wants to obtain a credit account, the consumer would have to provide, among other things, identifying information such as, there name, current address, current employer, etc. The identifying information would be used to perform a credit check of the consumer's credit history and qualifications based on the credit issuer's selection criteria. In one embodiment, the check may occur at one or more of a number of possible credit reporting agencies.

It should be appreciated that the obtaining or accessing of user information conforms to applicable privacy laws (e.g., federal privacy laws, state privacy laws, etc.) and applicable fair credit reporting act laws. In one embodiment, prior to accessing user information, the user affirmatively "opts-in" to the services described herein. For example, during the use of an issuer's mobile application, the user is prompted with a choice to affirmatively "opt-in" to various services. As a result, any information is obtained with the user's prior permission. Moreover, depending on present or future credit account requirements, rules and regulations, the credit application aspects described herein may be more or less formal.

In one embodiment, if the application is mobile web based instead of a mobile app, the mobile web may not be able to access the GPS data on the mobile app. However, the mobile web may be able to use the location information provided by the communication provider (carrier) to obtain location data that is similar to the mobile device GPS data. One way to obtain the information would be to use an API to push the carrier information to the mobile web application.

Overview

Using position location information to pre-populate and verify information on a credit application is discussed herein. In one embodiment, the application is completed via interaction with the user through the user's mobile device. In one embodiment, by providing the application via the user's mobile device the user can receive and review the offer at a less stressful location as compared to when the offer is made by an associate at the point of sale (POS). That is, by moving the application process away from the POS the user does not feel "put on the spot" or rushed by other customers in line, etc. Further, the user can choose to complete the application at home, at a restaurant, coffee shop, or the like.

Moreover, after obtaining the location information from the user's mobile device, that information can be used for pre-population and form filling for questions that are part of the application process and are provided to the user on the mobile device. In other words, by using the location information, a number of fields in the application will be pre-populated which will reduce the amount of work a user has to do inputting the information. This work reduction will allow the process to flow faster and reduce user form abandonment.

In general, pre-population or prefilling portions of an application with information gained from the location information can be done in a number of different ways. In one way, for example, if the application has a home address section, and the home address can be specifically determined based on the location information, then the entire home address section of the application would be pre-populated. That is, when the applicant reached that portion of the application, they would already see their address filled into the proper section of the application. The complete prefill may be simply browsed over by the applicant, or there may be a single confirmation button. Thus, instead of the applicant having to type in street number, name, town, state, and zip code, they would "save" those keystrokes.

In another way, using a similar example, if the application has a home address section, and the home address can be generally determined based on the location information, some of the home address section of the application would be pre-populated. That is, when the applicant reached that portion of the application, they would already see parts of their address filled into the proper section of the application. For example, the town, state, and zip code may already be completed based on the location information. Thus, instead of the applicant having to type in street number, street name, town, state, and zip code, they would "save" those town, state, and zip code keystrokes and only need to input the street number and street name.

In yet another way, again using a similar example, if the application has a home address section, and the home address can be generally determined based on the location information, some of the home address section of the application would be pre-populated. That is, when the applicant reached that portion of the application, they would already see parts of their address filled into the proper section of the application. For example, the town, state, and zip code may already be completed based on the location information. In addition, the location information would narrow down the possible street names that are found within the range of the determined home location and then provide a number of options for reducing the required keystrokes. For example, the street name may be provided from a drop down menu, or when the applicant begins to type the name of the street an autofill/autocomplete will provide the remainder of the name. Thus, instead of the applicant having to type in street number, street name, town, state, and zip code, they would "save" those town, state, and zip code keystrokes and only need to input the street number and then either select from the drop down, or type in only a partial portion of the street name.

In general, application abandonment occurs when an applicant needs to fill out an application and the applicant quits filling out the application before providing all of the needed information. In other words, the more questions on an application that need answers, the more likely it will be that the applicant will abandon the application before completion. Thus, if the application is prepopulated with information, there will be fewer blanks for the applicant to fill in. The fewer blanks will allow the applicant to complete the application before becoming frustrated, distracted, overwhelmed, or the like. As such, the percentage of applicants completing the application form is inversely related to the amount of keystrokes required by the applicant to complete the application.

Importantly, the embodiments of the present invention, as will be described below, provide a process for using position location information to pre-populate and verify information on an application which differs significantly from the conventional processes used for applicant to complete an application. In conventional approaches, when filling out an application, such as to apply for credit, the applicant must key in a lot of information such as name, address, phone number, birthday, identification number, etc. Such conventional approaches are error prone, tedious, time-consuming, and can oftentimes cause an applicant to quit the application process before it is completed. Instead, the present embodiments, as will be described and explained below in detail, provide a previously unknown procedure to reduce the amount of data an applicant has to key in by extrapolating the location data provided by the applicant's mobile device to determine home and work addresses and other location based information. Thus, embodiments of the present invention provide a streamlined method for application pre-population which extends well beyond what was previously capable.

As will be described in detail, the various embodiments of the present invention do not merely implement conventional processes for using position location information to pre-populate and verify information on a credit application on a computer. Instead, the various embodiments of the present invention, in part, provide a previously unknown procedure for reducing the amount of data an applicant has to key in by extrapolating the location data provided by the applicant's mobile device to determine home and work addresses and other location based information. Hence, embodiments of the present invention provide a novel process for mobile application form population which is necessarily rooted in computer technology to overcome a problem specifically arising in the realm of digital applicant key fatigue.

Further, the various embodiments of the present invention, in part, provide a previously unknown procedure for detecting fraud or errors in the information that is provided in the application. For example, by extrapolating the location data provided by the applicant's mobile device to determine home and work addresses and other location based information, the extrapolated location information can be compared with the location information provided in the application. Hence, embodiments of the present invention provide a novel process for detecting errors and/or attempted fraud in application information which is necessarily rooted in computer technology to overcome a problem specifically arising in the realm of credit application fraud or credit application denial.

Moreover, the embodiments do not recite a mathematical algorithm; nor do they recite a fundamental economic or longstanding commercial practice. Instead, they address a number of business challenges including the loss of credit applications due to key fatigue. Another key benefit is the early determination of fraudulent credit applications, and a reduction in the loss of credit application approvals due to inadvertent input errors. Thus, the embodiments do not "merely recite the performance of some business practice known from the pre-Internet world along with the requirement to perform it on the Internet. Instead, the embodiments are necessarily rooted in mobile location based technology in order to overcome problems specifically arising in the realm of customer application fatigue and fraud protection.

Operation

Figure 1A:
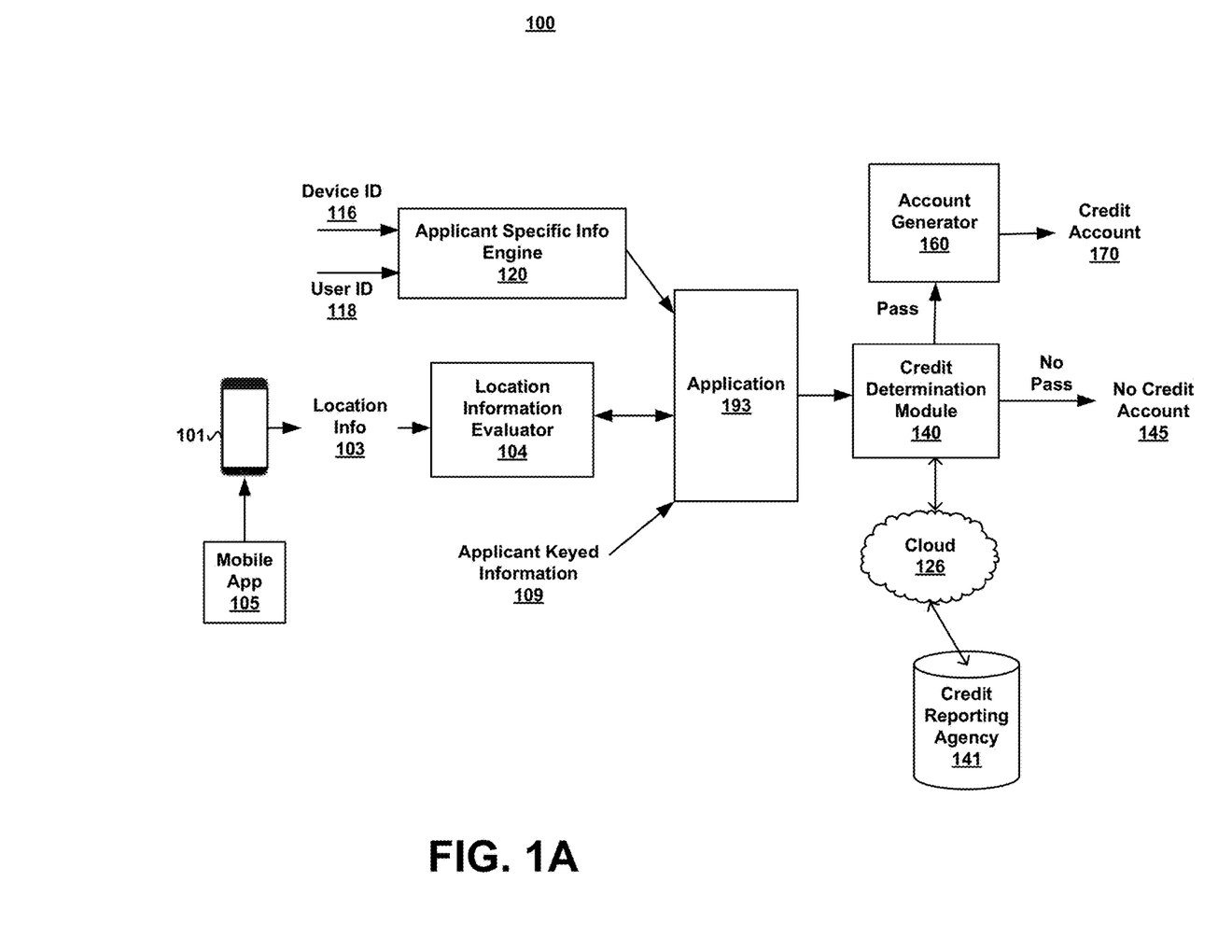
FIG. 1A is a block diagram of a system using position location information to pre-populate and verify information on a credit application, in accordance with an embodiment.

With reference now to FIG. 1A, a block diagram of a system 100 using position location information 103 to pre-populate and verify information on a credit application 193 is shown in accordance with an embodiment. System 100 includes a mobile device 101 having a mobile application 105 installed thereon, applicant keyed information 109, location information evaluator 104, user specific information engine 120, and application 193.

Mobile device 101 may be a mobile phone, a smart phone, a tablet, a smart watch, a piece of smart jewelry, smart glasses, and other user portable devices having wireless connectivity. That is, the mobile device would be capable of broadcasting and receiving via at least one network, such as, but not limited to, WiFi, Cellular, Bluetooth, NFC, and the like. In one embodiment, the mobile device may have a positioning determining system such as global positioning system (GPS) or the like. In another embodiment, the mobile device may be able to determine a location within a given radius, such as the broadcast range of a beacon, WiFi hotspot, overlapped area covered by a plurality of mobile telephone signal providers, or some combination thereof.

Mobile application 105 is obtained from an application store, or by scanning a visual code such as a barcode, a QR code on a physical item such as a poster, or the like. In another embodiment, mobile application 105 is received by the user's mobile device, e.g., via a beacon broadcast, WiFi broadcast, email, or the like. In one embodiment, mobile application 105 obtains authorization from mobile device 101 to access location information 103 on the mobile device 101.

Location information 103 refers to the location of the mobile device at different times of day as generated by a positioning system on the mobile device 101. Because of the different positioning systems available on a mobile device, the location information 103 provided by one or more positioning system on the mobile device 101 can include differing levels of accuracy. For example, a GPS enabled mobile device 101 can provide location information 103 that is accurate to within a few meters or less. In contrast, location information 103 derived from cellular service, beacon or WiFi location capabilities of mobile device 101 can provide a location radius or location area that may be within 10-50 meters or even larger.

Location information evaluator 104 uses location information 103 to determine an actual address. For example, in one embodiment, the location information 103 provided by mobile device 101 are provided as coordinates data. In order to determine an address, location information evaluator 104 cross-references the coordinate data with one or more different coordinate-to-address determination sources such as: mapping software, surveyor data that includes business and/or residential information, County assessor's information, or other coordinate-to-address determiners. Further operation of location information evaluator 104 is shown and described in FIG. 4.

User specific information engine 120 receives a device ID 116 and/or a user ID 118 and utilizes the ID's to obtain user specific information useable to prepopulate application 193. The operation of user specific information engine 120 is discussed in more detail in the discussion of FIG. 1B Applicant keyed information 109 refers to information that is keyed/typed or otherwise input into application 193.

In one embodiment, the location information determined by location information evaluator 104, and the user specific information provided by the user specific information engine 120 is prefilled into the application 193. By populating application 193 prior to presenting them to the applicant, the abandonment rate will be improved as the application 193 completion process is reduced. In other words, the amount of applicant keyed information 109 will be reduced.

In general, credit determination module 140 accesses a credit reporting agency 141 via cloud 126 to determine credit information for the user based on the application information. An example of cloud 126 is a network such as described herein. The credit reporting agency 141 may be a company such as, but not limited to, Experian, Equifax, TransUnion, Innovis and the like.

Credit determination module 140 will analyze the user's credit information provided by credit reporting agency 141 to determine if the user passes the criteria established to obtain a credit account. In one embodiment, credit determination module 140 will also determine a credit account limit. For example, the credit account limit may be 1000.00 USD.

If the user does not pass the criteria established to obtain a credit account, no credit account 145 is established and no further action is taken.

If the user does pass the credit criteria established to obtain a credit account, the applicant's information is passed to account generator 160 and a credit account 170 is generated. In one embodiment, credit account generator 160 provides a digital credit account 170 identifier to the mobile device. In one embodiment, the digital credit account identifier is instantly available to be used as a form of payment.

One example of a digital credit account identifier is a temporary shopping pass displayed on the display of the mobile device. In one embodiment, the temporary shopping pass includes aspects such as: the user's name, credit limit, store card account number, terms of use for the temporary shopping pass, a rotating GIF to prevent screenshots from being accepted at POS, a banner asking customer to present their ID to the associate to use the temporary account, and the like.

Figure 1B:
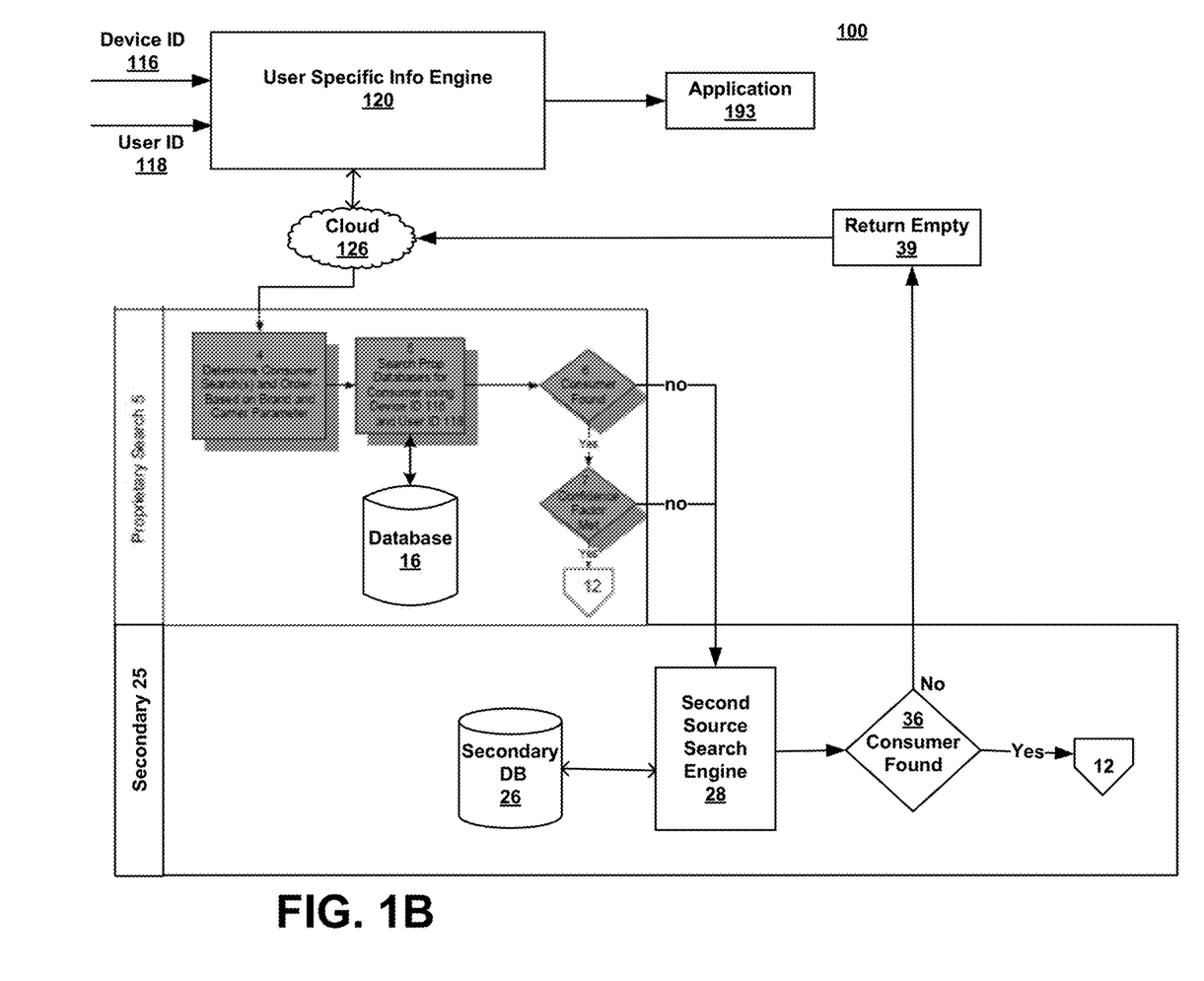
FIG. 1B is a block diagram of a secondary application information obtaining system, in accordance with an embodiment.

Referring now to FIG. 1B, a block diagram of a secondary application information obtaining system 150 is shown in accordance with an embodiment. In one embodiment, secondary application information obtaining system 150 includes a device ID 116, a user ID 118, a user specific information engine 120, a proprietary search area 5, and a secondary search area 25. Although a number of applications and components are shown in secondary application information obtaining system 150, it should be appreciated that the components and applications may be located separately from one another. For example, one or more of the components and applications may be found on one or more locations, such as, but not limited to a computer at the credit account provider, a server at a remote location, on the cloud 126 or the like.

In general, device ID 116 is the mobile device's phone number, SIM card integrated circuit card identifier (ICCID), unique device identifier (UDID), or the like.

User ID 118 is the user's zip code, social security number or portion thereof, driver's license number or portion thereof, or the like that is used to identify a specific user.

In one embodiment, any device ID 116 and/or any user ID 118 will be used by user specific information engine 120 to obtain user specific information useable to prepopulate an electronic form such as application 193. In general, user specific information includes: a name, full or partial home address, full or partial work address, a driver's license number, a social security number, or the like.

As shown in FIG. 1B, user specific information engine 120 may access the different search locations via the cloud 126. An example of cloud 126 is a network such as the Internet, local area network (LAN), wide area network (WAN), or the like.

One embodiment uses the device ID 116 and/or user ID 118 information to perform a proprietary search 5 of at least one proprietary database 16. In general, the proprietary database 16 may be one or more databases such as a credit accounts database, or the like, that store a company's private database such as an Alliance Data Legacy database or the like. Proprietary database 16 will include user specific information for customers that have existing accounts with the company, have previously applied for an account, or the like.

In one embodiment, the proprietary search 5 will only search a database related to a specific company. For example, if the incentive provider is a specific company, e.g., Nash's skate and bike emporium, then in a company specific database search, only the existing customer information related to Nash's skate and bike emporium will be searched. For example, a check is performed to see if the customer has an existing brand account, e.g., is already an existing customer in the database.

However, if the proprietary search 5 is for a group of companies, a shared information database, or the like, then all of the customer information in the databases may be searched for a match with the device ID 116 or the user ID 118. For example, if the database includes Nash's skate and bike, Mike's hardware, and Tarrin's dress stores, and all three companies are sharing information, then the search would encompass all three store's databases of information.

For example, search an internal accountholder database to see if the consumer has another account within the shared information database. For example, if the customer does not have a Nash's skate and bike account, the underlying credit account, e.g., Alliance Data database is searched to see if the customer has an account at a different brand associated with Alliance Data.

In one embodiment, consumer information 6 that is found in the proprietary database 16 will be verified using a confidence factor 7. For example, if only one record is found and it is 5 days old, the confidence in the found records would likely be below a confidence threshold. In contrast, if 2 years of records are found, records such as prior accounts, present accounts, memberships, rewards information, and the like, then the confidence in the user specific information found in the records would be above the confidence factor threshold. If the user specific information is above the confidence threshold, then the user specific information is deemed valid. At that point, the user specific information is returned via return information 12 to user specific info obtainer 120 and then imported into the application.

If no user specific information is found during the proprietary search 5 or if the found user specific information cannot be validated, then the device ID 116 and user ID 118 are passed on to a secondary search 25. At secondary search 25, a second source search engine 28 will search at least one secondary source database 26. One example of secondary source database 26 is a reverse phone number look up such as reverse phone look-up. However, other secondary source databases may be searched such as, but not limited to: social media sites, search engines, online public and/or private records, reverse name and phone number engines, and the like. In one embodiment, the user specific information may be obtained by performing a secondary source database 26 search with the user ID 118 and the device ID 116.

In one embodiment, the secondary search 25 may be for example, a real-time call to a reverse phone look-up product to try and locate the consumer. In general, reverse phone look-up products provide accurate and current consumer telephone information. In many cases, the data is updated regularly from a broad range of sources, including regional bell operating companies, white pages and proprietary sources. One embodiment also integrates validation and authentication aspects that add further benefits to append address information for a consumer. In general, validation and authentication aspects match consumer name and zip code information that was returned from the reverse phone look-up, against data from a secondary source to return full address data.

If consumer information 36 is found then the user specific information is returned via return information 12 to user specific info obtainer 120. If no user specific information is found from the secondary sources 25, then no user specific information will be pre-populated into the application 193. That is, the user specific info obtainer 120 will receive a return empty 39. However, if a match is made, then the user specific information can be used to prepopulate a portion of the application 139. E.g., name, address, city, state, zip, mobile phone number, email, etc. of the application.

Application Pre-Population

Figure 2:
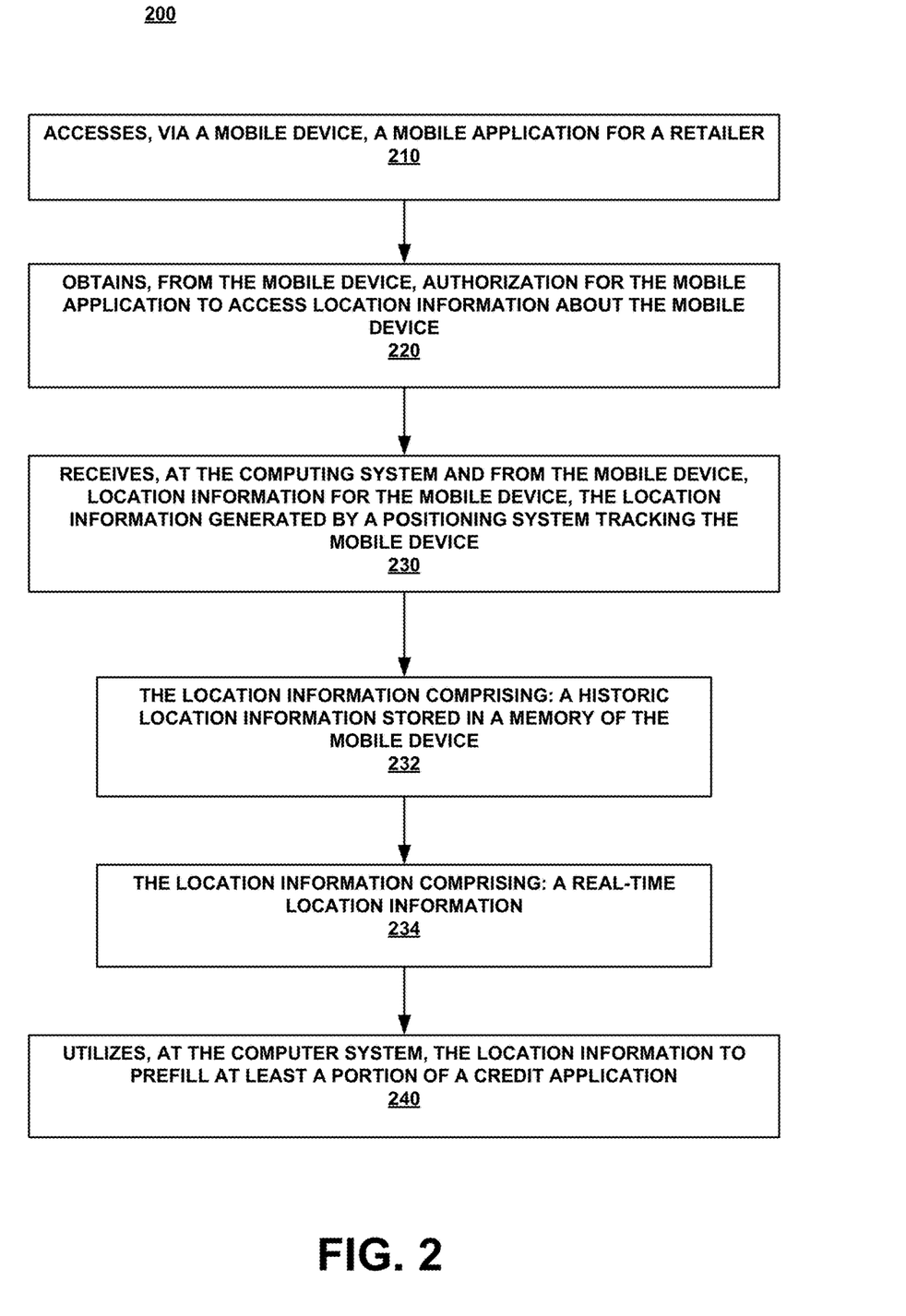
FIG. 2 is a flowchart of a method for using position location information to pre-populate information on a credit application, in accordance with an embodiment.

With reference now to FIG. 2, a flowchart 200 of a method for using position location information to pre-populate a credit application 193 is shown in accordance with an embodiment.

With reference now to 210 of FIG. 2, one embodiment accesses an application for a retailer. In one embodiment, the accessing is via a mobile device 101. In another embodiment, the accessing is via a laptop or other computing asset. In one embodiment, the application is a mobile application 105 that is accessed via mobile device 101. For example, mobile application 105 is obtained from an application store, or by scanning a visual code such as a barcode, a QR code on a physical item such as a poster, or the like. In another embodiment, mobile application 105 is received by the user's mobile device, e.g., via a beacon broadcast, WiFi broadcast, email, or the like.

With reference now to 220 of FIG. 2, one embodiment obtains, from the mobile device 101, authorization for the mobile application 105 to access location information 103 about the mobile device 101.

Figure 4:
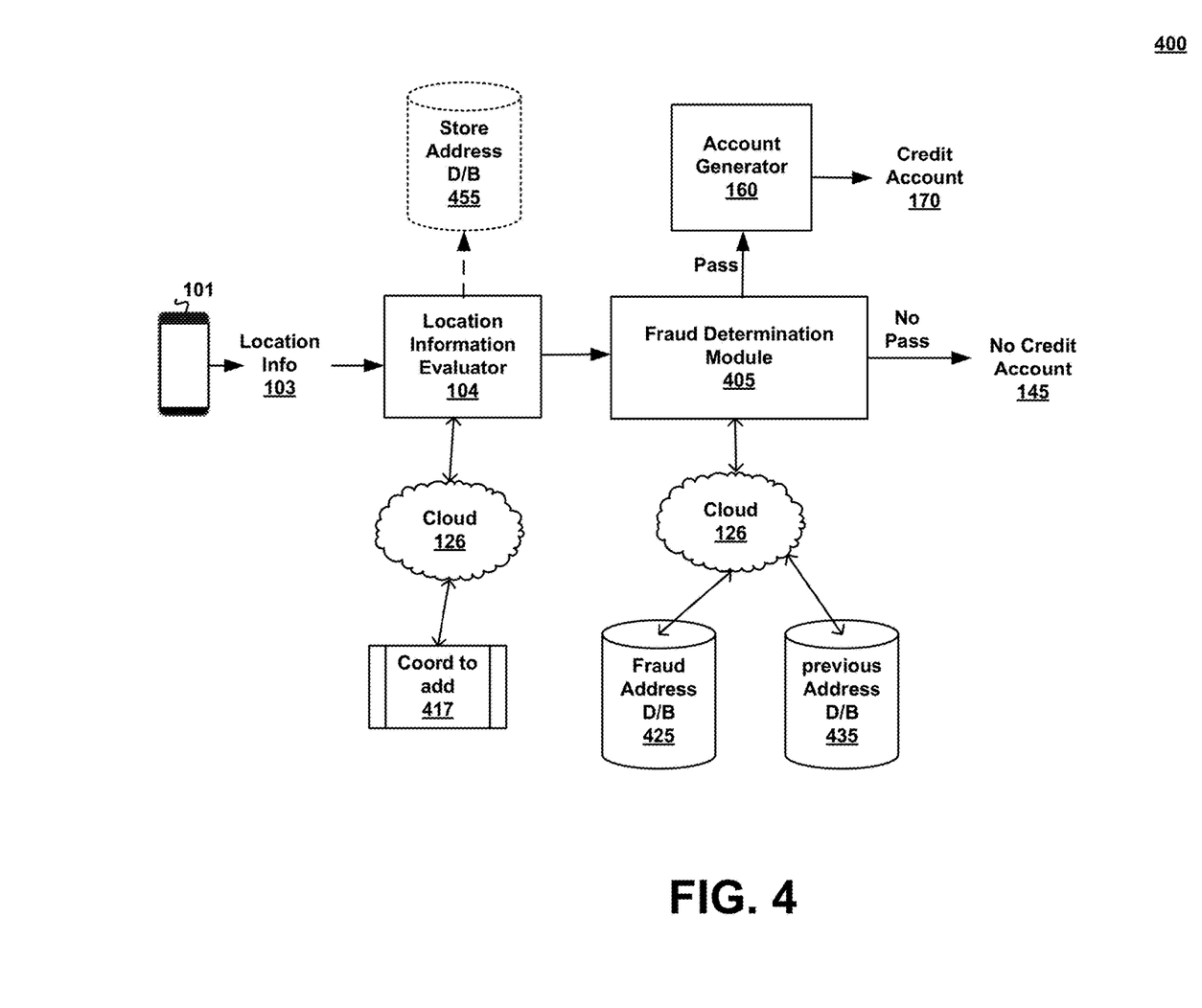
FIG. 4 is a block diagram of an example fraud detection system, in accordance with an embodiment.

With reference now to 230 of FIG. 2, one embodiment receives, at the computer system (e.g., at location information evaluator 104 as further shown in system 400 of FIG. 4) and from mobile device 101, location information 103 for mobile device 101, the location information 103 generated by a positioning system tracking the mobile device 101. In one embodiment, the positioning system is on the mobile device, and is one or more of, but is not limited to, GPS, WiFi, cellular service, beacon derived location determination, NFC ranges, Bluetooth range, and the like. In another embodiment, the positioning system is virtual, that is, it is not on the mobile device 101 but is an interface, such as a GPS chip interface, that functions with software or web applications allowing the location functionality to work outside of a traditionally defined mobile device 101 or mobile application.

Because of the different positioning systems available on a mobile device, the location information 103 provided by one or more positioning system on the mobile device 101 can include differing levels of accuracy. For example, a GPS enabled mobile device 101 can provide location information 103 that is accurate to within a few meters or less. In contrast, location information 103 derived from cellular service, beacon or WiFi location capabilities of mobile device 101 can provide a location radius or location area that may be within 10-50 meters or even larger. For example, the mobile device 101 being located within range of a beacon at ninth street, a Wi-Fi hot-spot at a given coffee shop, within range or a single cellular service tower, within an overlapping area of a number of cellular service towers, a combination of the above, and the like.

In one embodiment, included with the location information 103 would be a level of accuracy. For example, location information 103 may be identified as having a high level of accuracy (0-5 meters), a medium level of accuracy (6-20 meters), a low level of accuracy (>20 meters), or the like. Although a number of different accuracies are discussed, it should be appreciated that there may be more or fewer levels of accuracy associated with location information 103. Further, the ranges of the different levels of accuracy disclosed may also be different based on preference, guidelines, needs, and the like.

Additionally, location information 103 may be determined by the positioning system at constant intervals, at pre-assigned time periods, when location determination commands are received, based on the use of the mobile device 101, a mobile application 105 on the mobile device 101, when a change is noted by the positioning system, and the like. Further, location information 103 may be recorded in the memory of the mobile device every time a location determination is made by the positioning system, at constant intervals, at pre-assigned time periods, when location storage commands are received, based on the use of the mobile device 101, mobile application 105 on the mobile device 101, when a change is noted in the location information 103, and the like. Likewise, the level of accuracy may be determined each time location information 103 is generated by the positioning system, only when the level of accuracy has changed, at certain intervals of location information 103 generation, or the like.

At 232, location information 103 includes historic location information stored in a memory of the mobile device. Historic location information refers to location information 103 that is not real-time location information. Historic location information will include a date/time stamp. The historic location information would allow the stored location information to be searched, sorted, and evaluated. In one embodiment, the historic location information includes all location information 103 stored on the memory of the mobile device 101. This may range back as long as the applicant has owned the mobile device. In another embodiment, the time range for the historic location information is limited. For example, the location data may only be obtained for a pre-defined time range, e.g., the past 2 years, 1 year, 6 months, 3 months, 3 weeks, 5 days, etc. Although a number of time ranges are provided, it should be understood that the time range may be user definable, application pre-defined, established by the credit provider, established by law or statute, state or country dependent, or the like.

At 234, location information 103 includes real-time location information obtained from the positioning system. Real-time location information would be location information 103 that is generated in real time by the positioning system. The real-time location information would be constantly replaced as location information 103 generated by the positioning system is received at the computer system, e.g., location information evaluator 104.

With reference now to 240 of FIG. 2, one embodiment utilizes at the computer system, e.g., location information evaluator 104, location information 103 to prefill at least a portion of a credit application 193.

In one embodiment, location information 103 provided by mobile device 101 is coordinate data. Therefore, to determine an address, the coordinate data is cross-referenced with one or more different coordinate-to-address determination sources such as: mapping software, surveyor data that includes business and/or residential information, County assessor's information, or other coordinate-to-address determiners.

Included with location information 103 would be the level of accuracy of the location information. As such, when the location information coordinate data is cross-referenced with the one or more different coordinate-to-address determination sources, the resulting address may be specific or may be a general ballpark area.

The high level of accuracy indication about the coordinate data would likely allow a specific address to be determined when location information 103 is cross-referenced with the one or more different coordinate-to-address determination sources.

The medium level of accuracy indication about the coordinate data may allow a specific address to be determined when location information 103 is cross-referenced with the one or more different coordinate-to-address determination sources, or may result in a general address area. The determination would be based on the actual level of accuracy, the density of businesses and residences within the radius of the location information, and the like. For example, in an area with houses on acre plots, the medium level of accuracy would indicate a specific house. However, in an area with clusters of businesses, such as a strip mall, the medium level of accuracy may only be able to narrow the business address to one of a few different possibilities.

In except for the most rural cases or largest company buildings, the low level of accuracy indication about the coordinate data would not allow a specific address to be determined when location information 103 is cross-referenced with the one or more different coordinate-to-address determination sources. However, even at the low level of accuracy the number of possible street names for a home or business address would be reduced.

In one embodiment, the applicant's likely home location is determined from location information 103 provided by mobile device 101. The computer system, e.g., location information evaluator 104, would evaluate the historical location information received from the device for a plurality of prior overnight time periods over a plurality of different nights. For example, location information 103 can be organized into time periods, e.g., midnight to 5 am and then reviewed for a prior time period, e.g., weeks, months, etc.

The likely home location is then determined based on the historical location information evaluation. For example, by sorting and then tallying the locations of mobile device 101 during the selected time period for e.g., the past 45 days, it is likely that the location that is found most often is where the applicant resides at night. Thus, it is likely the applicant's home location.

The applicant's likely home location, and the associated accuracy value of location information 103, is then cross-referenced with the one or more different coordinate-to-address determination sources, to generate an address. If the accuracy of the likely home location is high enough, a complete address for the applicant's likely home is obtained. The complete address is then prefilled into the home address portion of application 193.

However, if the accuracy of the likely home location is not high enough to obtain a specific address, at least some level of information about the likely home location is obtained and provided to application 193. For example, a prefill capability for the application 193 can be simplified, or a drop down menu populated, by knowing what is local to the likely home location. As such, when the applicant is filling out the street address, the likely home location information is used to limit the number of possible streets that are offered in a drop down menu, a quick fill such as a type completion algorithm, or the like.

For example, if the applicant starts typing with the letter 'M', the limited number of possible streets within the likely home location area will cause application 193 to offer only those M street names. In this example, Maple, Moore, and Murray. After the applicant types 'M', the application will present the applicant with the prefill options of Maple, Moore, and Murray, from which the applicant can select. Alternatively, if the applicant continues by typing a 'u', the prefill will complete Murray as it is the only street within the likely home location containing those starting letters. Similarly, in the drop down menu context, every street name within the likely home location would be provided in the drop down menu and the applicant would select the correct street name from the drop down menu.

Likewise, the applicant's likely work address is determined from location information 103 provided by mobile device 101. The computer system, e.g., location information evaluator 104, would evaluate the historical location information received from the device for a plurality of prior daytime periods over a plurality of different days. For example, the location information 103 can be organized into time periods, e.g., 9 am to 4 pm and then reviewed for a prior time period, e.g., weeks, months, etc.

A likely work address is then determined based on the historical location information evaluation. For example, by sorting and then tallying the locations where mobile device 101 was located during the selected time period for e.g., the past 30 days, it is likely that the location that is found most often is where the applicant works. Thus, it is likely the location of the applicant's work address.

Similar to above, the applicant's likely work location, and the associated accuracy value of location information 103, is then cross-referenced with the one or more different coordinate-to-address determination sources, to generate an address. If the accuracy of the likely work location is high enough, a complete work address for the applicant is likely obtained. The complete work address is then prefilled into the work address portion of application 193.

As recited above, if the accuracy of the likely work location is not high enough to obtain a specific address, at least some level of information about the likely work location is obtained and provided to application 193. For example, a prefill capability for the application 193 can be simplified, or a drop down menu populated, by knowing what is local to the likely work location. As such, when the applicant is filling out the street address, the likely work location information is used to limit the number of possible streets that are offered in a drop down menu, the quick fill type completion algorithm, or the like.

It should be appreciated that information for a number of different locations can be obtained in the same manner as described above. For example, the historical location information could be used, by the computer system, to determine an amount of time that the applicant has spent at a retail store location. The amount could be the total amount of time, the amount over the past month, week, or the like. If the amount of time surpasses an established threshold, the credit account 170 would receive a recommendation for an initial credit limit increase for the applicant.

Thus, the location information can be used to determine one or more of: a full or partial home address, a full or partial work address, a location where the application was completed, locations where the applicant spends a lot of time, locations where the applicant does not go, and the like.

Verification/Risk Assessment/Fraud Detection

Figure 3:
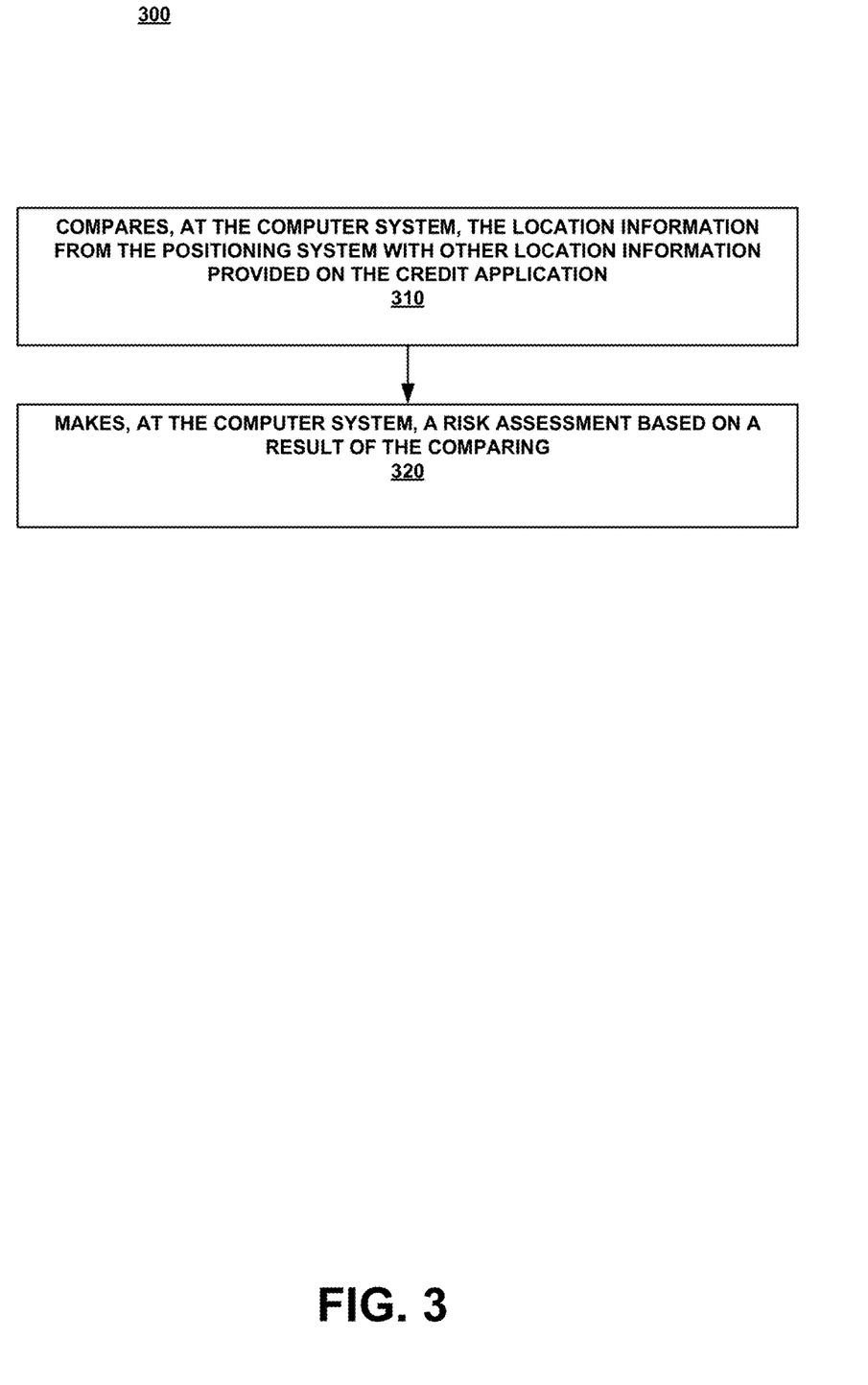
FIG. 3 is a flowchart of a method for using position location information to verify information on a credit application, in accordance with an embodiment.

With reference now to 310 of FIG. 3, one embodiment compares, at the computer system, e.g., location information evaluator 104, the location information from the positioning system with other location information provided on the credit application 193.

In one embodiment, the other location information provided within the credit application 193 is information provided by the applicant, e.g., applicant keyed information 109. Additionally, application 193 could include other location information obtained from a driver's license scan or search, from a search utilizing the mobile number provided by the mobile device, from the user specific info engine 120 of FIG. 1B which uses some applicant identification and/or device identification information to perform a search for information. One or more of the sources may provide the resultant information into the application 193.

Verification

For example, location information 103 was used by location information evaluator 104 to determine that the applicant's home address is 123 Market Street. The other sources have also provided a home address of 123 Market Street to be prefilled into application 193. Since the comparing of the location information 103 obtained from mobile device 101 with the information for the credit application obtained from another source matches, a verification of the probable home address is made.

Updating/Replacing

In the updating example, location information evaluator 104 determined that the applicant's home address is likely 123 Market Street. However, information obtained from one or more of the other sources have provided a different home address, e.g., 99 Onion Way to be prefilled into application 193. Since the comparing of the location information 103 obtained from mobile device 101 with the information obtained from another source result in a difference between the two possible addresses, the information obtained from the one or more other sources is replaced with the location information 103 during the prefilling of application 193.

In one embodiment, in addition to replacing the location information obtained from the one or more other sources with the location information 103 from mobile device 101 in the application 193, the location information 103 from mobile device 101 can also be provided to the one or more of the other sources that had provided a different address. Such that the one or more other sources, e.g., 120 et al., will contain the updated location information.

Since there are a number of home addresses found, location information evaluator 104 compares the likely home address determined from the downloaded location information 103 with the home address provided on the credit application 193.

Risk Assessment

Referring now to 320 of FIG. 3, one embodiment makes, at the computer system, e.g., fraud determination module 405 of FIG. 4, a risk assessment based on a result of the comparing. The following discussion utilizes the home address for the comparing. However, it should be appreciated that any or all addresses determined to be of interest in the application, e.g., home, work, etc. can be subject to the comparing. However, for purposes of clarity, the following example refers to the home address.

For example, when the comparing results in a similar or a matching home address as described in the verification portion, a risk solution from the risk assessment, would likely result in a low concern for fraud, e.g., it is likely that the address in the application 193 is correct.

In contrast, when the comparing results in a dissimilarity, as described in the updating/replacing section, a risk assessment would likely result in a concern of medium or high level fraud. For example, depending upon the source that provided the conflicting location information, the level of fraud risk would likely, but not necessarily, be different. For example, if the information was input by user specific info engine 120, the difference may be due to an incorrect match with the applicant, the applicant having moved, or the like. In that case, the level of fraud risk may be set to medium which would, in one embodiment, result in the applicant receiving a credit account 170 having a reduced initial credit limit.

However, if the incorrect information was input into application 193 by the applicant, the difference is likely due to error or deceit. Thus, a risk assessment would likely result in a concern a higher fraud risk. In one embodiment, due to the higher fraud risk, the applicant would receive a denial of the credit account, e.g., no credit account 145.

Alternatively, prior to denying the credit account, the applicant may receive an additional question about the inconsistency of the home address provided in application 193. If the applicant recognizes the mistake, and changes it to a home address that matched the historical location information determination, then it is probable that the fraud risk level would be lowered to either the medium, e.g., the applicant receiving a credit account 170 having an initial credit limit reduction, or a low concern, e.g., the applicant receiving a credit account having no initial credit limit reduction.

Fraud Detection

With reference now to FIG. 4, a block diagram of a system for fraud detection is described in accordance with an embodiment. In general, system 400 includes a fraud determination module 405 which receives address information from the location information evaluator 104 which determines the address from the raw location information 103 provided by mobile device 101. System 400 also includes cloud 126 which may be any type or wired or wireless network connection including private, public, Local, Wide, Internet, and the like.

Known Fraudulent Address

In one embodiment, the location where the applicant completed the application is determined by location information evaluator 104 from the location information 103 provided by the mobile device 101. The location information evaluator 104 would evaluate the real-time location information 103 and cross-reference the real-time location information 103 with the one or more different coordinate-to-address determination sources 417, to generate a likely address. Similar to above, if the accuracy of the location information is high enough, a complete address for where the applicant completed the application will be obtained. If the accuracy of the location information is not high enough, then a general area for where the applicant completed the application will be obtained.

In one embodiment, fraud determination module 405 will access a database 425 of known fraudulent addresses and compare the location where the application was completed with the known fraudulent addresses found in the database. Fraud determination module 405 will determine, based on the comparing, whether the location where the application was completed is found in the database 425 of known fraudulent addresses. If the location where the application 193 was completed is found in the database 425 of known fraudulent addresses the credit application will be denied and no credit account 145 will be established. In contrast, if the location where the application 193 was completed is not found in the database 425 of known fraudulent addresses the credit application will pass the fraud determination and the application will be passed to account generator 160 who will evaluate the application 193 and issue a credit account 170.

If the location where the application 193 was completed cannot be defined specifically enough to ensure that it is not a match for, or not found in, the addresses of database 425 of known fraudulent addresses, then the fraud determination module 405 will be able to make a number of choices. For example, if the general location where the application 193 was completed is in an area that includes a threshold number (e.g., 4 within the same block, etc.) of known fraudulent addresses, fraud determination module 405 will deny the credit application and no credit account 145 will be established. In contrast, if the general location where the application 193 was completed is in an area that includes no known fraudulent addresses, fraud determination module 405 may pass the credit application to account generator 160 with a small fraud determination resulting in a suggestion that the initial credit amount be lowered accordingly. However, if the general location where the application 193 was completed is in an area that includes less than a threshold number (e.g., 2 within the same block, etc.) of known fraudulent addresses, fraud determination module 405 may pass the credit application to account generator 160 with a medium fraud determination resulting in a suggestion that the initial credit amount be lowered significantly.

In one embodiment, lowered accordingly may mean a reduction of 10-20% from what would have been the initial credit amount while lowered significantly would mean a reduction of 50-75% in the initial credit amount. However, it should be appreciated that these percentages are one example. The risk aversion of the credit account provider may cause and increase or decrease in the percentages and even turn the medium risk applications into rejections such that no credit account 145 is established.

Previously Used Addresses

In one embodiment, fraud determination module 405 will access a database 435 of previously used addresses and compare the location where the application was completed with the previously used addresses found in the database. Fraud determination module 405 will determine, based on the comparing, whether the location where the application was completed is found in the database 435 of previously used addresses.

If the location where the application 193 was completed is not found in the database 435 of previously used addresses the credit application will pass the fraud determination and the application will be passed to account generator 160 who will evaluate the application 193 and issue a credit account 170.

However, if the location where the application 193 was completed is found in the database 435 of previously used addresses, fraud determination module will determine a type of residence at the location where the application was completed. In one embodiment, the type of residence may be found in the database 435 of previously used addresses. In another embodiment, fraud determination module 405 will receive additional information about the location from the one or more different coordinate-to-address determination sources 417 via location information evaluator 104. The additional information will be used to determine the type of residency.

Fraud determination module 405 will then make a risk assessment based on a result of the determination of the type of residence.

For example, if the location where the application 193 was completed is found in the database 435 of previously used addresses and it is determined that the type of residence at that address is a single family home, then the fraud determination module 405 will be able to make a number of choices. If the number of applications received from the previously used address exceeds a threshold number (e.g., 3 within the same single family home) fraud determination module 405 will deny the credit application and no credit account 145 will be established.

In contrast, if the number of applications received from the previously used address is less than a threshold number (e.g., 2 within the same single family home) fraud determination module 405 may pass the credit application to account generator 160 with a low fraud determination resulting in a suggestion that the initial credit amount be lowered accordingly.

Similarly, if the location where the application 193 was completed is found in the database 435 of previously used addresses and it is determined that the type of residence at that address is a multi-family home (e.g., condo, townhome, apartment building, etc.), then the fraud determination module 405 will determine the number of dwellings within the multi-family home. If the number of applications received from the previously used address exceeds a threshold number (e.g., 80% of the dwellings within the multi-family home) fraud determination module 405 will pass the credit application to account generator 160 with an intermediate fraud determination resulting in a suggestion that the initial credit amount be lowered accordingly.

In contrast, if the number of applications received from the previously used address is less than a threshold number (e.g., 80% of the dwellings within the multi-family home) fraud determination module 405 will pass the credit application to account generator 160 with a low fraud determination resulting in a suggestion that the initial credit amount be lowered accordingly.

In one embodiment, if the location where the application 193 was completed cannot be defined specifically enough to ensure that it is not a match for, or not found in, the addresses of database 435 of previously used addresses, then the fraud determination module 405 would report that lack of fraud determination to account generator 160. In another embodiment, if the location where the application 193 was completed cannot be defined specifically enough to ensure that it is not a match for, or not found in, the addresses of database 435 of previously used addresses, then the fraud determination module 405 would deny the application and no credit account 145 would be established.

However, it should be appreciated that these solutions to the problem that occurs when the location where the application 193 was completed cannot be defined specifically enough may be defined differently based on the risk aversion of the credit account provider. For example, the credit account provider may provide specific guidance such as an increase or decrease in the percentages, turn the medium risk applications into rejections such that no credit account 145 is established, or turn the rejections into some level of risk such that a credit account 170 is opened.

Store Attribution

In one embodiment, as described previously, the location where the applicant completed the application is determined by location information evaluator 104 from the location information 103 provided by the mobile device 101. The location information evaluator 104 would evaluate the real-time location information 103 and cross-reference the real-time location information 103 with the one or more different coordinate-to-address determination sources 417, to generate a likely address. Similar to above, if the accuracy of the location information is high enough, a complete address for where the applicant completed the application will be obtained. If the accuracy of the location information is not high enough, then a general area for where the applicant completed the application will be obtained.

In one embodiment, location information evaluator 104 will access a database 455 of retail location addresses and compare the location where the application was completed with the retail location addresses found in the database. Location information evaluator 104 will determine, based on the comparing, whether the location where the application was completed is found in matches a retail location address. If the location where the application 193 was completed does match a retail location address, location information evaluator 104 will automatically provide store attribution to the retail store associated with the retail location address.

Thus, in one embodiment, by utilizing the data sources to prepopulate the application 193, the application process can be reduced to 9 keystrokes (1, "Yes its my home")+(4, last four of social security number)+(3, Date Of Birth, e.g., via a drop down menu)+(1, "Submit Application")=9 keystrokes.

Example Computer System Environment

Figure 5:
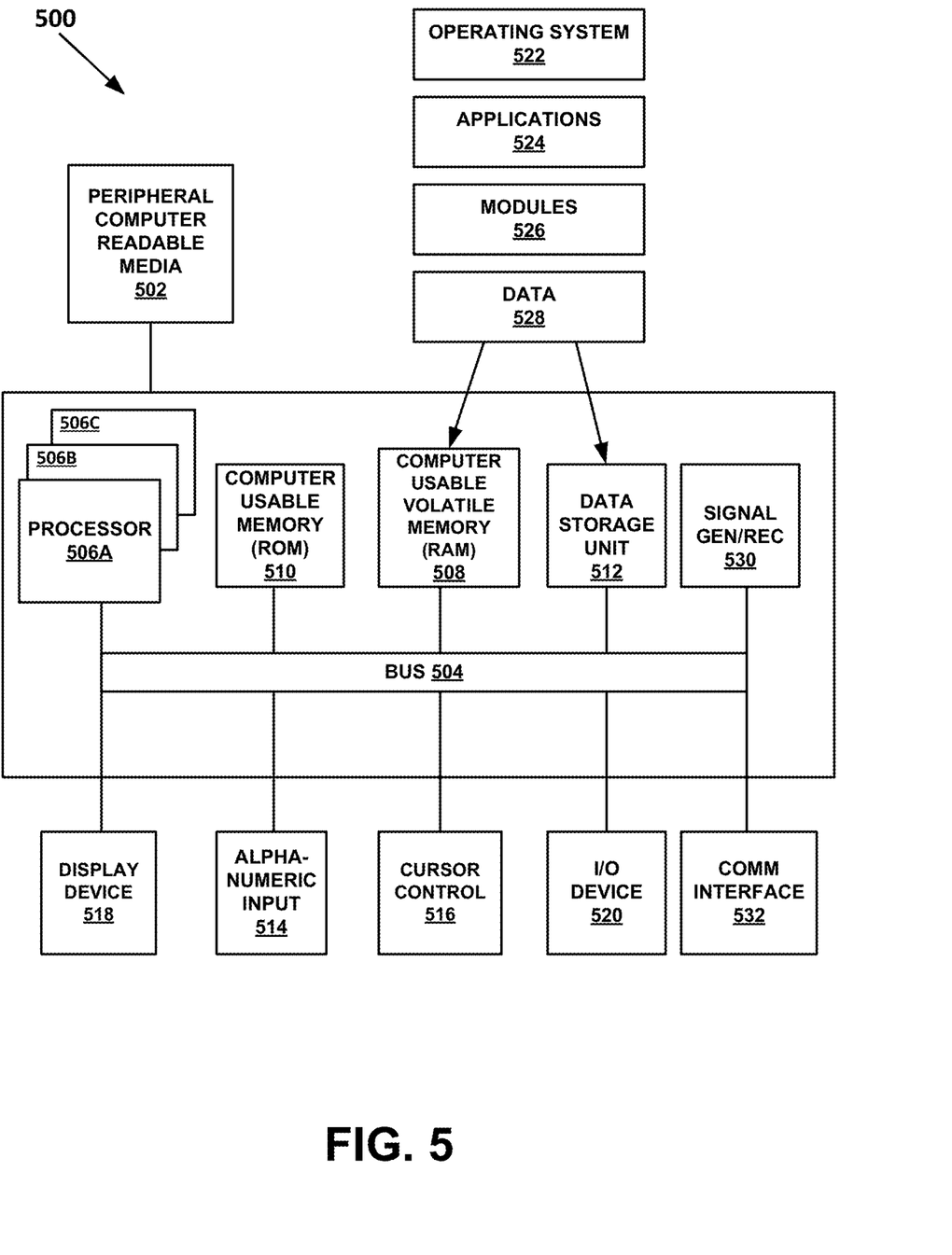
FIG. 5 is a block diagram of an example computer system with which or upon which various embodiments of the present invention may be implemented.

With reference now to FIG. 5, portions of the technology for providing a communication composed of computer-readable and computer-executable instructions that reside, for example, in non-transitory computer-readable storage media of a computer system. That is, FIG. 5 illustrates one example of a type of computer that can be used to implement embodiments of the present technology. FIG. 5 represents a system or components that may be used in conjunction with aspects of the present technology. In one embodiment, some or all of the components described herein may be combined with some or all of the components of FIG. 5 to practice the present technology.

FIG. 5 illustrates an example computer system 500 used in accordance with embodiments of the present technology. It is appreciated that system 500 of FIG. 5 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 5, computer system 500 of FIG. 5 is well adapted to having peripheral computer readable media 502 such as, for example, a disk, a compact disc, a flash drive, and the like coupled thereto.

Computer system 500 of FIG. 5 includes an address/data/control bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. Computer system 500 also includes data storage features such as a computer usable volatile memory 508, e.g., random access memory (RAM), coupled to bus 504 for storing information and instructions for processors 506A, 506B, and 506C.

System 500 also includes computer usable non-volatile memory 510, e.g., read only memory (ROM), coupled to bus 504 for storing static information and instructions for processors 506A, 506B, and 506C. Also present in system 500 is a data storage unit 512 (e.g., a magnetic disk drive, optical disk drive, solid state drive (SSD), and the like) coupled to bus 504 for storing information and instructions. Computer system 500 also includes an optional alpha-numeric input device 514 including alphanumeric and function keys coupled to bus 504 for communicating information and command selections to processor 506A or processors 506A, 506B, and 506C. Computer system 500 also includes an optional cursor control device 516 coupled to bus 504 for communicating user input information and command selections to processor 506A or processors 506A, 506B, and 506C. Optional cursor control device may be a touch sensor, gesture recognition device, and the like. Computer system 500 of the present embodiment also includes an optional display device 518 coupled to bus 504 for displaying information.

Referring still to FIG. 5, optional display device 518 of FIG. 5 may be a liquid crystal device, cathode ray tube, OLED, plasma display device or other display device suitable for creating graphic images and alpha-numeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick, non-contact input, gesture recognition, voice commands, bio recognition, and the like. In addition, special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

System 500 is also well suited to having a cursor directed by other means such as, for example, voice commands. Computer system 500 also includes an I/O device 520 for coupling system 500 with external entities. For example, in one embodiment, I/O device 520 is a modem for enabling wired or wireless communications between system 500 and an external network such as, but not limited to, the Internet or intranet. A more detailed discussion of the present technology is found below.

Referring still to FIG. 5, various other components are depicted for system 500. Specifically, when present, an operating system 522, applications 524, modules 526, and data 528 are shown as typically residing in one or some combination of computer usable volatile memory 508, e.g. random access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the interne. In one embodiment, the present technology, for example, is stored as an application 524 or module 526 in memory locations within RAM 508 and memory areas within data storage unit 512. The present technology may be applied to one or more elements of described system 500.

System 500 also includes one or more signal generating and receiving device(s) 530 coupled with bus 504 for enabling system 500 to interface with other electronic devices and computer systems. Signal generating and receiving device(s) 530 of the present embodiment may include wired serial adaptors, modems, and network adaptors, wireless modems, and wireless network adaptors, and other such communication technology. The signal generating and receiving device(s) 530 may work in conjunction with one or more communication interface(s) 532 for coupling information to and/or from system 500. Communication interface 532 may include a serial port, parallel port, Universal Serial Bus (USB), Ethernet port, Bluetooth, thunderbolt, near field communications port, WiFi, Cellular modem, or other input/output interface. Communication interface 532 may physically, electrically, optically, or wirelessly (e.g., via radio frequency) couple computer system 500 with another device, such as a mobile phone, radio, or computer system.

The computing system 500 is only one example of a suitable computing environment and is not intended to suggest any limitation as to the scope of use or functionality of the present technology. Neither should the computing environment be interpreted as having any dependency or requirement relating to any one or combination of components illustrated in the example computing system 500.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A non-transitory computer-readable storage medium having instructions embodied therein that when executed cause a computer system to perform a method for using position location information to pre-populate and verify information on a credit application, the method comprising:
    accessing, via a mobile device, a mobile application for a retailer;
    obtaining, from the mobile device, authorization for the mobile application to access location information about the mobile device;
    receiving, at the computer system and from the mobile device, location information for the mobile device,
        the location information generated by a positioning system tracking the mobile device,
        the location information comprising:
            a historical location information for a plurality of prior overnight time periods over a plurality of different nights stored in a memory of said mobile device; and
            a real-time location information;
    evaluating, at said computer system, said historical location information for said plurality of prior overnight time periods over said plurality of different nights;
    determining, at said computer system, a number of possible home address street names based on said historical location information;
    limiting an options available in a home address drop down menu of the credit application to only said determined number of possible home address street names;
    evaluating, at said computer system, said real-time location information;
    determining, at said computer system, based on the real-time location information, a number of possible real-time location street names for the location where the credit application is being completed;
    limiting an options available in a real-time location drop down menu of the credit application to only the determined number of possible real-time location street names; and
    providing, to the mobile device and from the computer system, said credit application, wherein said credit application is pre-populated with said home address drop down menu comprising only said determined number of possible home address street names and said real-time location drop down menu comprising only said determined number of possible real-time location street names.

2. The non-transitory computer-readable storage medium of claim 1, further comprising:
    obtaining information for the credit application from another source,
    the other source selected from a group of sources consisting of:
        information obtained from another credit account,
        information obtained utilizing a mobile number provided by the mobile device, and
        information obtained from a driver's license search.

3. The non-transitory computer-readable storage medium of claim 1, further comprising:
    accessing a database of known fraudulent addresses;
    comparing a provided home address with the known fraudulent addresses found in the database;
    determining, based on the comparing of said provided home address with the known fraudulent addresses found in the database, whether the provided home address is found in the database of known fraudulent addresses; and
    denying the credit application when the provided home address is found in the database of known fraudulent addresses.

4. The non-transitory computer-readable storage medium of claim 1, further comprising:
    receiving, at the computer system and from the mobile device, location information for the mobile device, the location information generated by said positioning system tracking the mobile device, the location information further comprising:
        a historical daytime location information for a plurality of prior daytime periods over a plurality of different days
    evaluating the historical daytime location information for said plurality of prior daytime periods over said plurality of different days;
    determining a likely work address based on the historical daytime location information;
    comparing the likely work address with a work address provided on the credit application; and
    making a location based risk assessment based on a result of the comparing of said likely work address with said work address provided on the credit application.

5. The non-transitory computer-readable storage medium of claim 4 further comprising:

determining, based on the comparing of said likely work address with said work address provided on the credit application, that the likely work address does not correlate with the work address provided on the credit application; and providing, to the credit applicant, a question about an inconsistency between the likely work address and the work address provided on the credit application.

6. The non-transitory computer-readable storage medium of claim 1, further comprising:

accessing a database of known fraudulent addresses;

comparing the location where the credit application was completed with the known fraudulent addresses found in the database;

determining, based on a result of the comparing of the location where the credit application was completed information with the known fraudulent addresses, whether the location where the credit application was completed is found in the database of known fraudulent addresses; and denying the credit application when the location where the credit application was completed is found in the database of known fraudulent addresses.

7. The non-transitory computer-readable storage medium of claim 1, further comprising:

accessing a database of retail location addresses;

comparing the location where the credit application was completed with the retail location addresses found in the database;

determining, based on a result of the comparing, the location where the credit application was completed matches a retail location address of said retail location addresses; and automatically providing store attribution to a retail store associated with the retail location address.

8. The non-transitory computer-readable storage medium of claim 1, further comprising:

accessing a database of previously used credit application addresses;

comparing the location where the credit application was completed with previously used credit application addresses in the database;

determining, based on the comparing, that the location where the credit application was completed does correlate with a previously used credit application address;

determining, based on the location information, a type of residence at the location where the credit application was completed; and making a location based risk assessment based on a result of the determination of the type of residence.

9. The non-transitory computer-readable storage medium of claim 8 further comprising:

determining that the type of residence is a multi-family home;

recommending, based on the multi-family home determination, an intermediate likelihood of fraud; and recommending, based on the intermediate likelihood of fraud, an initial credit limit reduction.

10. The non-transitory computer-readable storage medium of claim 8 further comprising:

determining that the type of residence is a single family home;

recommending, based on the single family home determination, a high likelihood of fraud; and recommending, based on the high likelihood of fraud, an initial denial of a credit account.

11. The non-transitory computer-readable storage medium of claim 1, further comprising:

utilizing the historical location information to determine an amount of time spent at a retail store location; and recommending an initial credit limit increase when the amount of time spent at the retail store location passes a threshold time spent requirement.

12. A system comprising:

one or more devices to:

provide a mobile application for a retailer to a mobile device;

receive authorization to access a global positioning system (GPS) location information on the mobile device;

obtain the GPS location information for the mobile device, the GPS location information comprising:

a historical location information for a plurality of prior overnight time periods over a plurality of different nights stored in a memory of said mobile device; and a real-time GPS location information;

utilize the GPS location information to prefill at least a portion of a credit application, the GPS location information having a first accuracy to provide a completely prefilled portion of the credit application, and the GPS location information having a second accuracy to provide a reduced number of prefill options for a portion of the credit application, the second accuracy less accurate than the first accuracy;

determine a number of possible home address street names based on said historical location information;

limit an options available in a home address drop down menu of the credit application to only said determined number of possible home address street names;

evaluate said real-time location information;

determine, based on the GPS location information, a number of possible real-time location street names at the location where the credit application is being completed; and limit an options available in a real-time location drop down menu of the credit application to only the determined number of possible real-time location street names.

13. The system of claim 12, wherein the location information further comprises historical GPS daytime location information for a plurality of prior daytime periods over a plurality of different days stored in said memory of the mobile device, said system further comprising:

one or more devices to:

review the historical GPS daytime location information for said plurality of prior daytime periods over said plurality of different days;

determine a likely work address based on the historical daytime GPS location information;

compare the likely work address with a work address provided on the credit application;

make a location based risk assessment recommendation based on a result of the comparing of said likely work address with said work address provided on the credit application, the location based risk assessment recommendation selected from the group consisting of:

no initial credit limit reduction when the comparing of said likely work address with said work address provided on the credit application results in a match, and an initial credit limit reduction when the comparing of said likely work address with said work address provided on the credit application results in a dissimilarity; and provide, when the likely work address does not correlate with the work address provided on the credit application, a question about an inconsistency between the likely work address and the work address provided on the credit application.

14. The non-transitory computer-readable storage medium of claim 13, further comprising:

making said location based risk assessment based on said result of said comparing, wherein when said comparing results in said dissimilarity, said risk solution of said location based risk assessment comprises a denial of a credit account.

* * * * *